(12) United States Patent
Brickell et al.

(10) Patent No.: US 7,908,653 B2
(45) Date of Patent: Mar. 15, 2011

(54) METHOD OF IMPROVING COMPUTER SECURITY THROUGH SANDBOXING

(75) Inventors: Ernie F. Brickell, Portland, OR (US); Clifford D. Hall, Orangevale, CA (US); Joseph F. Cihula, Hillsboro, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1030 days.

(21) Appl. No.: 10/881,602

(22) Filed: Jun. 29, 2004

(65) Prior Publication Data

US 2006/0021029 A1    Jan. 26, 2006

(51) Int. Cl.
*G06F 12/14*    (2006.01)
*G06F 12/16*    (2006.01)

(52) U.S. Cl. ............... 726/22; 726/23; 726/24; 726/26; 726/2; 726/3; 713/181; 713/189; 709/220; 709/215; 709/229; 709/246

(58) Field of Classification Search .................. None
See application file for complete search history.

(56) References Cited

U.S. PATENT DOCUMENTS

| | | | |
|---|---|---|---|
| 5,974,549 A | | 10/1999 | Golan et al. |
| 6,275,938 B1 * | | 8/2001 | Bond et al. ............ 726/23 |
| 6,308,275 B1 * | | 10/2001 | Vaswani et al. ............ 726/2 |
| 6,873,988 B2 * | | 3/2005 | Herrmann et al. ............ 707/10 |
| 7,051,366 B1 * | | 5/2006 | LaMacchia et al. ............ 726/14 |
| 7,058,822 B2 * | | 6/2006 | Edery et al. ............ 726/22 |
| 7,086,090 B1 * | | 8/2006 | Dawson et al. ............ 726/24 |
| 7,131,143 B1 * | | 10/2006 | LaMacchia et al. ............ 726/30 |
| 7,401,230 B2 * | | 7/2008 | Campbell et al. ............ 713/190 |
| 7,603,704 B2 * | | 10/2009 | Bruening et al. ............ 726/22 |
| 7,720,939 B1 * | | 5/2010 | Leroy ............ 709/220 |
| 7,761,917 B1 * | | 7/2010 | Kumar ............ 726/23 |
| 7,770,202 B2 * | | 8/2010 | Brumme et al. ............ 726/1 |
| 2002/0013910 A1 * | | 1/2002 | Edery et al. ............ 713/201 |
| 2003/0130834 A1 * | | 7/2003 | Krishnan ............ 703/26 |
| 2003/0135791 A1 * | | 7/2003 | Natvig ............ 714/38 |
| 2003/0229794 A1 * | | 12/2003 | Sutton et al. ............ 713/189 |
| 2004/0034794 A1 * | | 2/2004 | Mayer et al. ............ 713/200 |
| 2004/0133794 A1 * | | 7/2004 | Kocher et al. ............ 713/193 |

FOREIGN PATENT DOCUMENTS

| | | |
|---|---|---|
| EP | 1130499 A | 9/2001 |
| JP | 10-501354 T2 | 2/1998 |
| JP | 2001-117769 A | 4/2001 |
| JP | 2002-503364 A | 1/2002 |
| JP | 2004-518193 A | 6/2004 |
| WO | 2006/012197 A2 | 2/2006 |
| WO | 2006/012197 A3 | 4/2006 |

OTHER PUBLICATIONS

M Borgsmiller:"RE: A Windows NT question '"Online! Jul. 15, 2002, XP002359662 The Gang List Retrieved from the Internet:URL:http://web.archive.org/web/20020715212819/http://wigner.cped.ornl.gov/the-gang/0286.html>'retrieved on Dec. 16, 2005; p. 2, paragraph 6.

(Continued)

*Primary Examiner* — Syed A. Zia (74) *Attorney, Agent, or Firm* — Steven Skabrat (57) ABSTRACT

Improving security of a processing system may be accomplished by at least one of executing and accessing a suspect file in a sandbox virtual machine.

16 Claims, 4 Drawing Sheets

OTHER PUBLICATIONS

Sterbenz A: "An evaluation of the Java security model" Computer Security Applications Conference,1996., 12th Annual San Diego,CA, USA Dec. 9-13, 1996, Los Alamitos, CA, USA, IEEE Comput.Soc, US, Dec. 9, 1996, pp. 2-14,XP010213036 ISBN: 0-8186-7606-X the whole document.

"Gateway Anti—virus and Anti—vandal protection" VOID,' Online! Feb. 1, 1998, XP002243883 p. 6, paragraph 2.
International Search Report, Jan. 4, 2006.
International Preliminary Report on Patentability received for PCT Application No. PCT/US2005/022227, mailed on Jan. 18, 2007, 3 pages.

* cited by examiner

METHOD OF IMPROVING COMPUTER SECURITY THROUGH SANDBOXING

BACKGROUND

1. Field

The present invention relates generally to computer security and, more specifically, to using virtualization techniques to improve the security of a computing platform.

2. Description

Computer viruses are a common problem for computer users. One typical mode of attack is to send an electronic mail message (e-mail) containing a file attachment to an unsuspecting user's computer. The file attachment contains malicious attack code, and the e-mail may contain some inducement for the user to launch the file attachment. When the user clicks on the file attachment, the attack code embedded in the file is executed. The attack code accesses an address book and sends the file attachment in an e-mail to addresses found in the address book. The attack code may then try to modify files on the user's computer or obtain other files and mail them back to the attackers.

Propagation of such an attack is rapid. Once one unsuspecting user launches the file attachment, the virus quickly spreads to other unsuspecting users, who then perpetuate the problem. Such viruses have been known to overwhelm computer networks and cause millions of dollars of damage to network operators, companies, and users.

Techniques exist to detect viruses and purge them from affected computers. However, such techniques often are used only after the virus has been detected and many computers have been infected. New methods are desired that will slow down the propagation of computer viruses and other malicious code, thus allowing the virus detectors to detect and delete the viruses before the damage becomes widespread.

Along with improving the ability to detect and slow such attacks it is also desired to prevent or limit damage to users' systems and access to users' data. The ideal world in which users would never run suspicious files will never exist, so a practical solution must recognize this and attempt to prevent or limit the program from damaging the user's system and accessing the user's data.

BRIEF DESCRIPTION OF THE DRAWINGS

The features and advantages of the present invention will become apparent from the following detailed description of the present invention in which.

DETAILED DESCRIPTION

An embodiment of the present invention is a method of using sandboxing to improve the security of a computing platform. Recent advances in virtualization give a computing platform the ability to run multiple virtual machines of protected computing environments so that execution of one environment will not interfere with the execution of another environment. Embodiments of the present invention use virtualization to create a sandbox virtual machine that is isolated from the rest of the computing platform. The sandbox may be used to open suspect files or execute suspect application programs so that if there is attack code in the suspect files or application programs, the attack will be contained in the sandbox. The attack code may then be dealt with according to prescribed policies. By accessing the suspect files only in the sandbox, further propagation of the attack code may be diminished and the attack may be more easily detected.

References in the specification to "one embodiment" or "an embodiment" of the present invention mean that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory.

Figure 1:
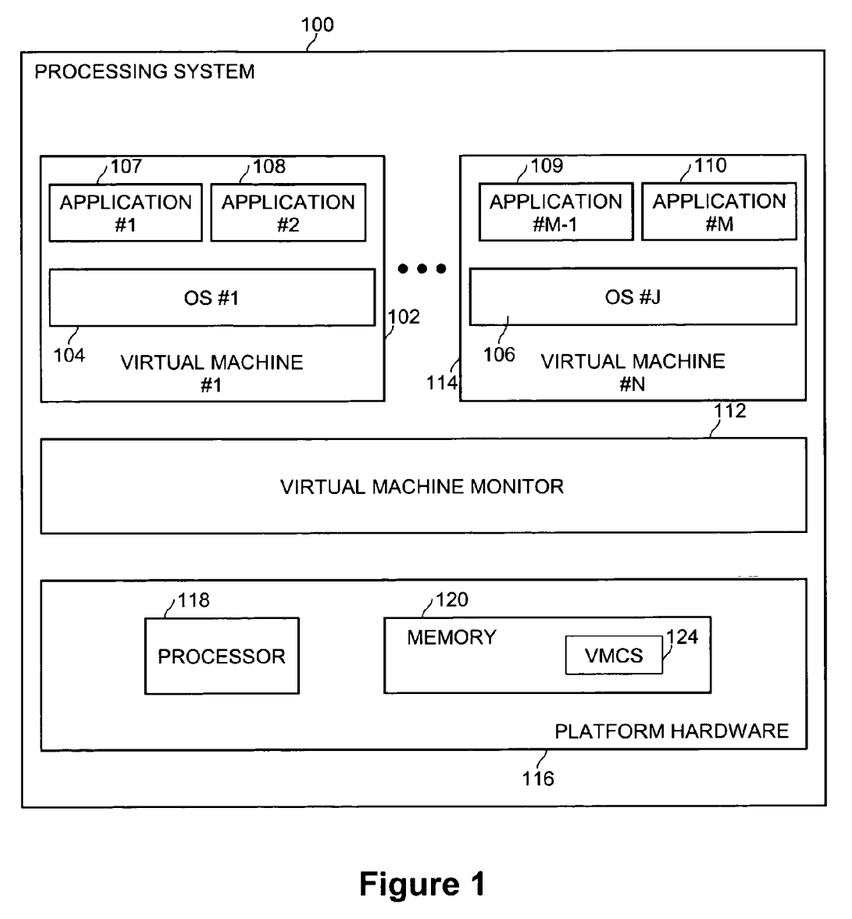
FIG. 1 illustrates one embodiment of a virtual machine environment, in which one embodiment of the present invention may operate.

FIG. 1 illustrates one embodiment of a virtual machine environment for a processing system 100, in which the present invention may operate. In this embodiment, bare platform hardware 116 comprises a computing platform, which may be capable, for example, of executing a standard operating system (OS) and a virtual machine monitor (VMM), such as a VMM 112.

The VMM 112, though typically implemented in software, may emulate and export a bare machine interface to higher level software. Such higher level software may comprise a standard or real-time OS, or may be a highly stripped down operating environment with limited operating system functionality that may not include traditional OS facilities, etc. The software may also include a version of firmware such as a BIOS. Alternatively, for example, the VMM 112 may be run within, on top of, or in parallel with another VMM. VMMs may be implemented, for example, in hardware, software, or firmware, or by a combination of various techniques.

The processing system 100 may be any one of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hard-coded logic for performing the execution of method embodiments of the present invention. Although FIG. 1 shows only one such processor 118, there may be one or more processors in the system, and each processor may run the same VMM, different VMMs, multiple VMMs, or no VMMs.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, virtual machine #1 102 and virtual machine #N 114, although in any given system any number of virtual machines may be implemented. The guest software running on each VM may include a guest OS such as guest OS #1 104 or OS #J 106 and various guest software applications 107, 108, 109 and 110. Each of the guest OSs 104 and 106 expect to access physical resources (e.g., processor registers, memory and I/O devices) within the VMs 102 and 114 on which the guest OS 104 or 106 is running and to perform other functions. For example, the guest OS may expect to have access to all registers, caches, structures, I/O devices, memory and the like, according to the architecture of the processor and platform presented in the VM. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various events such as exceptions (e.g., page faults, general protection faults, etc.), interrupts (e.g., hardware interrupts, software interrupts), and platform events (e.g., initialization (INIT) and system management interrupts (SMIs)). Some of these events are "privileged" because they must be handled by the VMM 112 to ensure proper operation of VMs 102 and 114 and for protection from and among guest software.

When a privileged event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain the state of guest software, the state of the VMM 112, execution control information indicating how the VMM 112 wishes to control operation of guest software, information controlling transitions between the VMM 112 and a VM, etc. The processor 118 reads information from the VMCS 124 to determine the execution environment of the VM and to constrain its behavior. In one embodiment, the VMCS is stored in memory 120. In some embodiments, multiple VMCS structures are used to support multiple VMs.

As used herein, a sandbox is an execution environment in which the code executing in the environment is restricted from some functionality. In embodiments of the present invention, a sandbox may allow code to execute, but the code may be quarantined so that the code cannot damage or access any of the computing platform outside of the sandbox. A file that is suspected of being malicious should be opened in a sandbox, so that if the file is malicious, the damage it might cause will be limited or prevented. In addition, a sandbox may be monitored for suspicious activity occurring, such as that during the opening of files or executing of code. In one embodiment, a sandbox may be implemented as a virtual machine.

Figure 2:
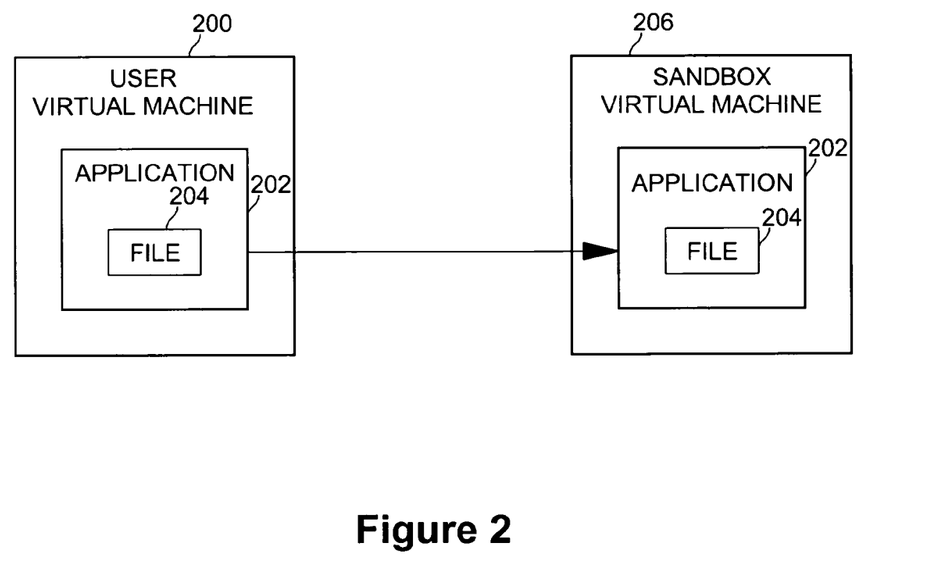
FIG. 2 is a diagram of a user virtual machine interacting with a sandbox virtual machine according to an embodiment of the present invention.

FIG. 2 is a diagram of a user virtual machine interacting with a sandbox virtual machine according to an embodiment of the present invention. In one example, a user may cause the execution of one or applications in a user virtual machine 200. For example, one application 202 may be an e-mail program. The user's computer may receive an e-mail that contains a file attachment 204. When the user clicks on the file attachment, instead of opening the file in the user virtual machine 200, the attachment 204 may be opened in a sandbox virtual machine 206 by another copy of the application 202, or perhaps by another program (not shown). The user may still be able to view the attachment as presented by the sandbox virtual machine, but the rest of the computing platform hosting the sandbox virtual machine may be protected from operations that occur in the sandbox. That is, the sandbox virtual machine may prevent certain specified operations from affecting files or other system resources outside of the sandbox. Thus, if the file attachment contains attack code that tries to distribute the attack to other users by accessing the address book of the e-mail application, the distribution will not be successful from the sandbox if the sandbox prevents the application from sending e-mails.

Figure 3:
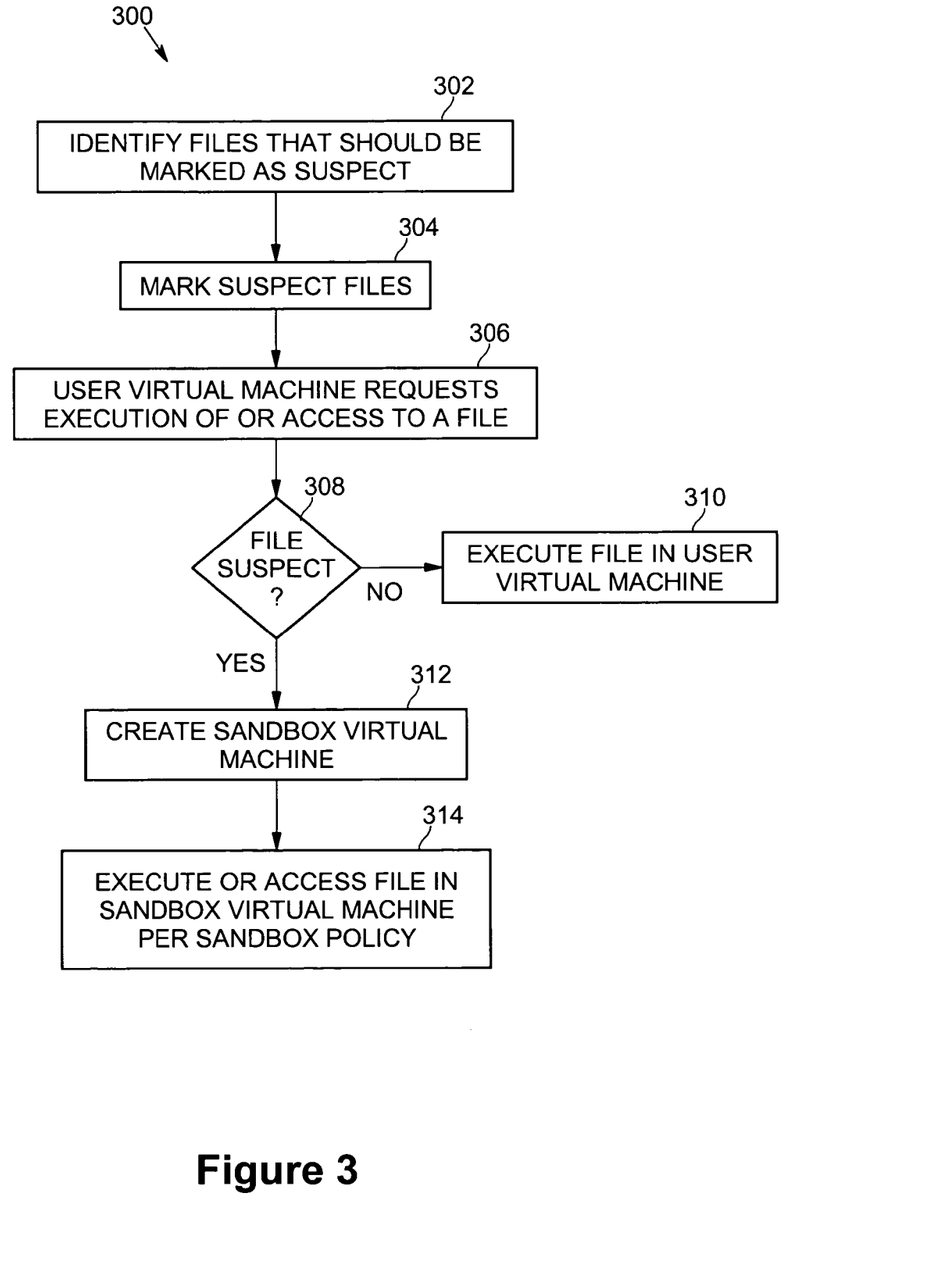
FIG. 3 is a flow diagram illustrating usage of a sandbox virtual machine according to an embodiment of the present invention.

FIG. 3 is a flow diagram 300 illustrating usage of a sandbox virtual machine according to an embodiment of the present invention. At block 302, an entity of the processing system identifies files that should be marked as suspect. In one embodiment, the entity may be the virtual machine manager (VMM). The user may also participate in the decision to mark files. In another embodiment, a special virtual machine may be running to perform sandbox management operations. A suspect file may be any file that is not yet trusted by the processing system. Upon entry into a processing system, a file or application program may be evaluated according to a predetermined file identification policy as to whether it should be marked as suspect or not. One example policy is that all files or applications not created on the processing system should be marked as suspect when they are received and first stored in the processing system. Another policy may be that if the file or application was digitally signed by a trusted signature key, then the file or application would not be identified as suspect, otherwise it would be considered suspect. These policies are merely illustrative, and other methods of identifying suspect files and applications may be used without departing from the scope of the present invention.

At block 304, once files are determined to be suspect, the entity marks the suspect files to denote that they are suspect. One skilled in the art will recognize that there are many ways to mark the files. One example method for marking files as suspect is to create an extension to the file system so that there is an annotation on each file indicating whether it is suspect or not. In one embodiment, this annotation may be a binary flag, where when the flag is set the file is considered suspect.

At some point in time after some marking activity has been performed, at block 306 software operating within a user virtual machine (such as an application program, for example) may request execution of or access to a file. For example, an e-mail attachment may be selected by the user to be executed. In another example, the user desires to have a selected application program access a file stored in the file system. At block 308, it may be determined whether the file is currently marked as suspect. If the file is not suspect, then the file may be executed or accessed within the user virtual machine at block 310. If the file is suspect, then the file may be processed within a sandbox virtual machine. In one embodiment, at block 312 a sandbox virtual machine may be created to process this particular file access request. In another embodiment, a permanent sandbox virtual machine may be active in the processing system to handle all such requests to access suspect files.

In another embodiment, the sandbox virtual machine may be created by "forking" a new virtual machine environment to construct a duplicate copy of the user virtual machine at the time that the sandbox is needed. One benefit of forking is that the original copy and the duplicate copy can begin to diverge, with the state of the original copy going completely unmodified, and hence serving as a known-good "checkpoint" of the machine state. If an attack is later observed in the duplicate copy, the system can simply revert back to the known-good checkpoint. VM "forking", therefore, goes a step beyond containing viruses or slowing their propagation, to also offering a method for recovering from an attack.

Once a sandbox virtual machine is active to handle the file access, at block 314 the file may be accessed or executed in the sandbox virtual machine according to the rules of a specified sandbox policy. The sandbox policy may define what actions may be taken as part of the file access. For example, software executing in a sandbox may be held to a policy that e-mail is not allowed to be sent from the sandbox. This may be enforced by having a policy checker component within the processing system capture any requests by the sandbox to send e-mail. As another example, software executing within the sandbox may not be allowed to delete or modify files in the processing system. In one embodiment this may be enforced by having all requests to modify files virtualized so that it would appear to the sandbox virtual machine that a request to modify files was being fulfilled, but in reality the request would be fulfilled using temporary files, so that no changes to permanent system files would be made. In another embodiment where the sandbox virtual machine was forked from a user virtual machine, after executing for period of time in a sandbox, the forked environment may be merged back into the user environment. At this point, a decision may be made as to whether to accept the changes to files requested by the sandbox virtual machine. In one example, no changes to system files made from within a sandbox may be accepted. Alternatively, if it is detected that the forked environment has be compromised by a virus attack, it could simply be discarded, and system operation can revert back to the original VM state, which serves a known-good checkpoint.

While a suspect file is executing in or being accessed within a sandbox virtual machine, an entity such as the virtual machine monitor (VMM) may be monitoring the sandbox for behavior that indicates attack code is being run. For example, the VMM may monitor the sandbox for changes to system files, for automated e-mail requests, or for attempts to access sensitive documents. If the VMM detects any of these behaviors, then the VMM could respond in one or more prescribed manners. For example, the VMM could mark the file as probable attack code, have the code deleted, notify the user, send the file to a security server for further evaluation, or perform other predetermined actions.

With embodiments of the present invention, not only can executable files be marked as suspect and executed in a sandbox, but in addition, data files can be marked as suspect and the application to access the data file can be executed in a sandbox. For example, an application might execute in the user virtual machine when it is accessing a trusted data file, but would execute in a sandbox when it is accessing a suspect data file. This accommodates the idea that code can be trusted, but when trusted code executes untrusted data, the resulting combination may still contain an attack.

Once a file has been marked as suspect, the file will remain marked as suspect unless some specific action is taken to remove the suspect marking on the file. A suspect file could be accessed multiple times and still remain marked as suspect. One policy for implementing the functionality of unmarking a suspect file is for the user to operate a virtual machine that is not a sandbox, and to request the import of the suspect file into that virtual machine. Another policy that may be used to unmark a suspect file is that after a file has been executed within a sandbox for a specified period of time without evidence of behavior indicative of attack code, then the file's suspect marking may be changed. In one embodiment, this unmarking may be implemented by unsetting the suspect flag for the file. In another embodiment, the user may selectively un-mark a file once it is believed to be trusted.

Figure 4:
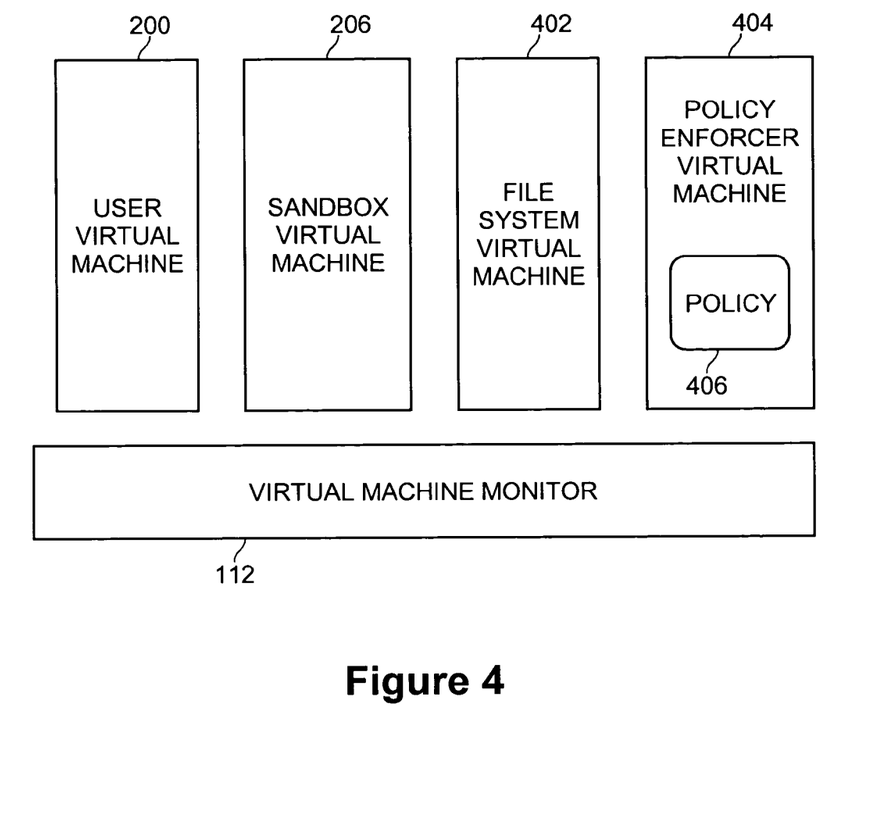
FIG. 4 is a diagram illustrating a virtual machine environment according to an embodiment of the present invention.

FIG. 4 is a diagram illustrating a virtual machine environment according to an embodiment of the present invention. In this embodiment, rather than have a VMM monitor the operations of the sandbox virtual machine, the entity performing the monitoring may be policy enforcer virtual machine 404. Alternatively, the monitoring entity could instead reside (at least in part) in another VM that performs additional actions. This virtual machine may interact with file system virtual machine 402 to ensure that attack code executing within the sandbox cannot modify files in the processing system. Requests to access the file system may be handled by the file system virtual machine. The policy enforcer virtual machine may enforce a predetermined policy 406 that describes the activities allowable by code being executed within the sandbox. In one example, the sandbox virtual machine may not be able to directly access the network so that any request by the sandbox virtual machine to access the network would be sent to the policy enforcer. The policy enforcer would then check the policy to see if the network access would be allowed. In this way, the policy enforcer could keep the sandbox virtual machine from sending email or from sending any information to the network.

Embodiments of the present invention may help to deter rapid propagation of some computer viruses. If a file attachment having attack code is opened using the present invention, the attachment would be opened in a sandbox. The sandbox may not be allowed to send out e-mail (depending on how the policy was defined), so the attack would not be replicated. The attack code might modify system files in the sandbox, but these changes would be made virtually, so that the actual system files would not be modified. After opening the file in the sandbox, a user may decide to move the file into another virtual machine. Although this is not as preferable as keeping the file in the sandbox, even this scenario may slow down virus propagation.

Although the operations may be described herein as a sequential process, some of the operations may in fact be performed in parallel or concurrently. In addition, in some embodiments the order of the operations may be rearranged without departing from the spirit of the invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A processing system supporting virtualization to run multiple independent virtual machines that do not interfere with each other comprising:
   a virtual machine monitor (VMM), to be executed on a processor of the processing system, to provide an abstraction of one or more virtual machines, and to identify and mark a file that is suspected of being malicious,
   a virtual machine control structure (VMCS) to store a state of guest software of the virtual machines, state of the VMM, and execution control information indicating how the VMM controls operation of guest software;
   a first application program running as guest software within a user virtual machine, to be executed on a processor of the processing system, wherein the first application program running within the user virtual machine is to request execution of or access to the suspected file;
   a second application program running as guest software within a sandbox virtual machine, to be executed on the processor of the processing system, the second application program being "forked" as a copy of the first application program, the sandbox virtual machine being a copy of the user virtual machine, wherein, in response to the first application program's request to execute or access the suspected file within the user virtual machine, the second application program running within the sandbox virtual machine to at least one of execute or access the suspected file, wherein the sandbox virtual machine's functionality is restricted by the VMM, thereby preventing damage caused by executing or accessing the suspected file outside of the sandbox virtual machine's execution environment; and
   a policy enforcer virtual machine to be executed on a processor of the processing system to identify and mark files that are suspect instead of the VMM identifying and marking the suspect files, and to enforce a sandbox policy defining allowable actions to be taken by the second application program running as guest software within the sandbox virtual machine during at least one of execution or accessing of the suspect file.

2. The system of claim 1, further comprising a file system virtual machine to be executed on a processor of the processing system to communicate with the second application program running within the sandbox virtual machine to handle access to a file system of the processing system and ensure that malicious code running in the sandbox virtual machine cannot modify files in the processing system outside of the sandbox virtual machine.

3. The system of claim 1, wherein the first application program, running as guest software within the user virtual machine is to at least one of execute or access a file that is not marked as a suspect file.

4. The system of claim 1, wherein the sandbox policy is to prevent at least one of sending electronic mail messages with the suspect file as an attachment and deleting files on the processing system, both being initiated from the second application program running within the sandbox virtual machine.

5. The system of claim 1, wherein the VMM identifies a suspected file based on an evaluation of the file according to a file identification policy.

6. The system of claim 1, wherein the VMM changes the marking of the suspect file when monitoring of at least one of execution or accessing of the suspect file by the sandbox virtual machine indicates that the file is not suspect.

7. A method comprising:
   identifying a file by a virtual machine manager (VMM) to be executed on a processor of a processing system, the processing system supporting virtualization to run multiple independent virtual machines that do not interfere with each other, the file being stored in a storage device of the processing system, the identified file to be marked as suspected of being malicious, the VMM to provide an abstraction of one or more virtual machines running on the processing system;
   marking the identified file, by the VMM, in response to the identifying;
   accepting a request to at least one of execute or access a file by a first application program running as guest software within a user virtual machine to be executed on a processor of the processing system;

at least one of executing or accessing the file by the first application program within the user virtual machine, to be executed on the processor, when the file is not marked as suspect; and creating, by the VMM, a second application program running as guest software within a sandbox virtual machine, to be executed on the processor of the processing system, the second application program being "forked" as a copy of the first application program, the sandbox virtual machine being created as a copy of the user virtual machine, and at least one of executing or accessing the file by the second application program within the sandbox virtual machine according to a policy when the file is marked as suspect, wherein the sandbox virtual machine's functionality is restricted by the VMM, thereby preventing damage caused by executing or accessing the suspected file outside of the sandbox virtual machine's execution environment; and preventing, based on the policy, at least one of sending electronic mail messages with the suspect file as an attachment or deleting files on the processing system, both being initiated from the second application program running within the sandbox virtual machine.

8. The method of claim 7, wherein identifying the file to be marked as suspect comprises evaluating the file according to a file identification policy.

9. The method of claim 7, further comprising changing the marking of the suspected file when monitoring, by the VMM, of at least one of execution or accessing of the suspect file by the second application program within the sandbox virtual machine indicates that the file is not malicious.

10. The method of claim 7, further comprising changing the marking of a suspect file from suspect to not suspect from within a user virtual machine.

11. The method of claim 7, further comprising determining if a file is marked as suspicious prior to attempting executing or accessing the file in the user virtual machine.

12. An article comprising a storage medium having a plurality of machine readable instructions, wherein when the instructions are executed by a processor, the instructions cause the processor to:

identify a file by a virtual machine manager (VMM) to be executed on the processor of a processing system, the processing system supporting virtualization to run multiple independent virtual machines that do not interfere with each other, the file being stored in a storage device of the processing system, the identified file to be marked as suspected of being malicious, the VMM to provide an abstraction of one or more virtual machines running on the processing system;

mark the identified file, by the VMM, in response to the identifying;

accept a request to at least one of execute or access a file by a first application program running as guest software within a user virtual machine to be executed on a processor of the processing system;

at least one of execute or access the file by the first application program within the user virtual machine, to be executed on the processor, when the file is not marked as suspect; and create, by the VMM, a second application program running as guest software within a sandbox virtual machine, to be executed on the processor of the processing system, the second application program being "forked" as a copy of the first application program, the sandbox virtual machine being created as a copy of the user virtual machine, and at least one of executing or accessing the file by the second application program within the sandbox virtual machine according to a policy when the file is marked as suspect, wherein the sandbox virtual machine's functionality is restricted by the VMM, thereby preventing damage caused by executing or accessing the suspected file outside of the sandbox virtual machine's execution environment; and prevent, based on the policy, at least one of sending electronic mail messages with the suspect file as an attachment or deleting files on the processing system, both being initiated from the second application program running within the sandbox virtual machine.

13. The article of claim 12, further comprising one or more instructions to cause the processor to identify the file to be marked as suspect comprises evaluating the file according to a file identification policy.

14. The article of claim 12, further comprising one or more instructions to cause the processor to change the marking of the suspected file when monitoring, by the VMM, of at least one of execution or accessing of the suspect file by the second application program within the sandbox virtual machine indicates that the file is not malicious.

15. The article of claim 12, further comprising one or more instructions to cause the processor to change the marking of a suspect file from suspect to not suspect from within a user virtual machine.

16. The article of claim 12, further comprising one or more instructions to cause the processor to determine if a file is marked as suspicious prior to attempting executing or accessing the file in the user virtual machine.

* * * * *